US009319737B2

(12) United States Patent
Raveendran et al.

(10) Patent No.: US 9,319,737 B2
(45) Date of Patent: Apr. 19, 2016

(54) TRANSPORT LAYER MODIFICATION TO ENABLE TRANSMISSION GAPS

(75) Inventors: Vijayalakshmi R. Raveendran, San Diego, CA (US); PhaniKumar K. Bhamidipati, San Diego, CA (US); James T. Determan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 12/984,032

(22) Filed: Jan. 4, 2011

(65) Prior Publication Data

US 2011/0164176 A1  Jul. 7, 2011

Related U.S. Application Data

(60) Provisional application No. 61/292,389, filed on Jan. 5, 2010, provisional application No. 61/298,491, filed on Jan. 26, 2010, provisional application No. 61/309,525, filed on Mar. 2, 2010.

(51) Int. Cl.
*H04N 21/434* (2011.01)
*H04N 21/4363* (2011.01)
(Continued)

(52) U.S. Cl.
CPC ........... *H04N 21/435* (2013.01); *H04N 21/235* (2013.01); *H04N 21/23614* (2013.01);
(Continued)

(58) Field of Classification Search
CPC ............ H04N 21/235; H04N 21/4344; H04N 21/435; H04N 21/4348; H04N 21/43637; H04N 21/23614
USPC .................... 348/470, 723, E05.093, E07.04; 370/239, 528, 522, 498, 480, 433, 435, 370/254, 242, 354, 342, 245, 516, 423, 535, 370/474, 476, 395, 397, 503, 508, 517, 370/519; 375/240.01–240.29
See application file for complete search history.

(56) References Cited

U.S. PATENT DOCUMENTS 4,079,380 A * 3/1978 Esry et al. ...................... 342/368
7,483,717 B2 * 1/2009 Champion et al. ............. 455/557
(Continued)

FOREIGN PATENT DOCUMENTS

CN 1288335 A 3/2001
CN 1658532 A 8/2005
(Continued)

OTHER PUBLICATIONS

Alvin Yau et al., "Cognitive Radio-based Wireless Sensor Networks: Conceptual Design and Open Issues", The 2nd IEEE Workshop on Wireless and Internet Services (WISe 2009) Zürich, Switzerland; Oct. 20-23, 2009. pp. 955-962.
(Continued)

*Primary Examiner* — Andrew Lai
*Assistant Examiner* — M Mostazir Rahman
(74) *Attorney, Agent, or Firm* — Campbell C. Chiang (57) ABSTRACT

White space devices are operable to communicate information over white space and, more specifically, to quiet a transmitter to enable sensing signals in the white space. A method for inconspicuous quieting of a transmitter in a white space communication device modifies a transport stream for transmission by the transmitter of the white space device to provide a null window of time. The null window does not contain essential information. At least a portion of the modified transport stream is transmitted by the transmitter of the white space device. The transmitter is quieted during the null window, and white space sensing is performed during the null window.

21 Claims, 4 Drawing Sheets

(51) Int. Cl.
  *H04N 21/435* (2011.01)
  *H04N 21/235* (2011.01)
  *H04N 21/236* (2011.01)
  *H04N 21/4402* (2011.01)

(52) U.S. Cl.
  CPC ....... *H04N21/4344* (2013.01); *H04N 21/4346* (2013.01); *H04N 21/4348* (2013.01); *H04N 21/43637* (2013.01); *H04N 21/440218* (2013.01)

(56) References Cited

U.S. PATENT DOCUMENTS

| | | | |
|---|---|---|---|
| 7,573,907 B2 | 8/2009 | Lakaniemi | |
| 8,031,807 B2 | 10/2011 | Shellhammer | |
| 2005/0036519 A1* | 2/2005 | Balakrishnan et al. | 370/503 |
| 2005/0169181 A1 | 8/2005 | Kim et al. | |
| 2005/0190822 A1* | 9/2005 | Fujii et al. | 375/211 |
| 2007/0098356 A1* | 5/2007 | Morimoto et al. | 386/68 |
| 2007/0204320 A1* | 8/2007 | Wu et al. | 725/135 |
| 2008/0090581 A1 | 4/2008 | Hu | |
| 2008/0130519 A1 | 6/2008 | Bahl et al. | |
| 2008/0146159 A1 | 6/2008 | Faltman et al. | |
| 2008/0165754 A1 | 7/2008 | Hu | |
| 2008/0279226 A1* | 11/2008 | Laud | 370/535 |
| 2008/0293353 A1 | 11/2008 | Mody et al. | |
| 2009/0047916 A1 | 2/2009 | Haykin | |
| 2010/0003922 A1 | 1/2010 | Zhou et al. | |
| 2010/0008385 A1* | 1/2010 | Noronha, Jr. | 370/545 |
| 2010/0172634 A1* | 7/2010 | Devictor et al. | 386/123 |
| 2010/0254682 A1 | 10/2010 | Masuno et al. | |
| 2011/0043710 A1* | 2/2011 | Samarasooriya et al. | 348/735 |
| 2011/0164177 A1 | 7/2011 | Raveendran et al. | |
| 2011/0299509 A1* | 12/2011 | Wang et al. | 370/336 |

FOREIGN PATENT DOCUMENTS

| | | |
|---|---|---|
| CN | 1960270 A | 5/2007 |
| EP | 1085750 A2 | 3/2001 |
| EP | 1562381 A1 | 8/2005 |
| JP | H11239179 A | 8/1999 |
| JP | 2004320302 A | 11/2004 |
| KR | 20010050431 A | 6/2001 |
| KR | 20050079194 A | 8/2005 |
| WO | WO2007000740 A1 | 1/2007 |
| WO | WO-2008061044 A2 | 5/2008 |
| WO | WO2011003079 A1 | 1/2011 |

OTHER PUBLICATIONS

Yucek et al. "A Survey of Spectrum Sensing Algorithms for Cognitive Radio Applications", IEEE Communication Surveys and Tutorials, vol. 11, No. 1, First Quarter 2009. pp. 116-130.

Akyildiz I F, et al., "CRAHNs: Cognitive radio ad hoc networks", Ad Hoc Networks, Elsevier, vol. 7, No. 5, Jul. 1, 2009, pp. 810-836, XP025952200, ISSN: 1570-8705, DOI: DOI:10.1016/J.ADH0C.2009.01.001 [retrieved on Jan. 14, 2009].

Anh Tuan Hoang, et al., "Adaptive Scheduling of Spectrum Sensing Periods in Cognitive Radio Networks" Global Telecommunications Conference, 2007. GLOBECOM '07. IEEE, IEEE, Piscataway, NJ, USA, Nov. 1, 2007, pp. 3128-3132, XP031196520 ISBN: 978-1-4244-1042-2.

Ashwini Kumar, et al., "A Case Study of QoS Provisioning in TV-Band Cognitive Radio Networks", Computer Communications and Networks, ICCCN 2009, Proceedings of 18th Internatonal Conference On, IEEE, Piscataway, NJ, USA, Aug. 3, 2009, pp. 1-6, XP031527803, ISBN: 978-1-4244-4581-3.

Dong Chen, et al., "PHY 28-3—In-Band Sensing without Quiet Period in Cognitive Radio", Wireless Communications and Networking Conference, 2008, WCNC 2008, IEEE, Piscataway, NJ, USA, Mar. 31, 2008, pp. 723-728, XP031243718, ISBN: 978-1-4244-1997-5.

International Search Report and Written Opinion—PCT/US2011/020228, International Search Authority—European Patent Office—Mar. 29, 2011.

International Search Report and Written Opinion—PCT/US2011/020239, International Search Authority—European Patent Office—Mar. 29, 2011.

Taiwan Search Report—TW100100405—TIPO—Aug. 7, 2013.

* cited by examiner

TRANSPORT LAYER MODIFICATION TO ENABLE TRANSMISSION GAPS

CROSS-REFERENCE TO RELATED APPLICATIONS

This application claims the benefit of: 1) U.S. Provisional Patent Application No. 61/292,389 filed Jan. 5, 2010; 2) U.S. Provisional Patent Application No. 61/298,491 filed Jan. 26, 2010; and 3) U.S. Provisional Patent Application No. 61/309,525 filed Mar. 2, 2010, the disclosures of which are expressly incorporated herein by reference in their entireties. The present application is related to, and hereby incorporates by reference the disclosure of, concurrently-filed and commonly-assigned U.S. patent application Ser. No. 12/984,038, filed on Jan. 3, 2011, titled "SYSTEMS AND METHODS FOR TRANSMITTER QUIETING IN A TELEVISION WHITE SPACE DEVICE".

BACKGROUND

1. Field

The present disclosure generally relates to white space devices that are operable to communicate information over white space and, more specifically, to systems and methods for operating a transmitter and a sensor in the white space.

2. Background

The Federal Communications Committee (FCC) is an independent agency of the United States government that is charged with regulating all non-federal government use of the radio spectrum (including radio and television (TV) broadcasting), and all interstate telecommunications (wire, satellite and cable) as well as all international communications that originate or terminate in the United States. In 2008, the FCC issued rules approving the unlicensed signal operation in the unused TV channels (i.e., white space). However, this approved, unlicensed use is subject to protections set in place for the primary users of the TV band. The primary users of the TV band are ATSC/National Television System Committee (NTSC) transmitters, such as TV broadcasters, and licensed wireless microphones. The new rules allow wireless technologies to use the white space as long as the technology and any resulting signal transmissions do not interfere with the existing primary users. Thus, periodic sensing is required to detect other signals. For purposes of this disclosure, the various devices that utilize such technologies to access this white space will be referred to as "white space devices," "unlicensed devices," or the like.

Wireless delivery of content to televisions (TVs) and other monitors and displays is desirable. As one example, it may be desirable, in some instances, to have content delivered from a user device for output on a TV device. For instance, as compared with many TV device output capabilities, many portable user devices, such as mobile telephones, personal data assistants (PDAs), media player devices (e.g., APPLE IPOD devices, other MP3 player devices, etc.), laptop computers, notebook computers, etc., have limited/constrained output capabilities, such as small display size, etc. A user desiring, for instance, to view a video on a portable user device may gain an improved multimedia experience if the video content were delivered for output on a TV device. Accordingly, a user may desire in some instances to deliver the content over white space from a user device for output on a monitor with an ATSC tuner (e.g., HDTV device) for an improved multimedia experience in receiving (e.g., viewing and/or hearing) the content. However, the transmission to the television device over white space requires sensing which would interfere with the multimedia experience.

SUMMARY

The present disclosure generally relates to white space devices that are operable to communicate information over white space and, more specifically, to systems and methods for unobtrusively quieting the transmitter for sensing other signals in the white space. In one aspect of the present disclosure, a method for inconspicuous quieting of a transmitter in a white space communication device includes modifying a transport stream for transmission by the transmitter of the white space communication device to provide a null window of time. The null window does not contain essential information. At least a portion of the modified transport stream is transmitted by the transmitter of the white space communication device. The transmitter is quieted during the null window, and white space sensing occurs during the null window.

In another aspect, a white space device has a transmitter configured to transmit multimedia information in a transport stream via white space. The white space device also has a white space sensor configured to sense signals present in the white space. The white space device also has a transport layer stream processor configured to process the transport stream to include a null window of time. The null window does not contain essential information.

In yet another aspect, a white space device has means for transmitting multimedia information in a transport stream via white space. The device also has means for sensing white space signals. The white space device also has means for modifying, with transport layer information, the transport stream to include a null window of time. The null window does not contain essential information.

In a further aspect, a computer readable medium has program code recorded thereon for inconspicuous quieting of a transmitter of a white space device. The program code includes program code to modify, with transport layer information, a transport stream for transmission by the transmitter of the white space device to include a null window of time. The null window does not contain essential information. The program code also includes program code to transmit the modified transport stream.

BRIEF DESCRIPTION OF THE DRAWINGS

For a more complete understanding of the present disclosure, reference is now made to the following description taken in conjunction with the accompanying drawings.

DETAILED DESCRIPTION

The word "exemplary" is used herein to mean "serving as an example, instance, or illustration." Any embodiment described herein as "exemplary" is not necessarily to be construed as preferred or advantageous over other embodiments.

White space devices generally refer to unlicensed wireless transceivers that communicate over the unused spectrum in the television band. These devices generally operate in a cognitive manner in which the devices scan first to detect TV band signals (e.g., Advanced Television Systems Committee (ATSC), National Television Systems Committee (NTSC), and certain wireless microphone protocols) from licensed primary users and then select unused channels in order to avoid interference with the licensed signals.

A white space device may be communicatively coupled with or integrated within a user device, and the white space device may thus deliver information (e.g., multimedia content) from the user device to a TV receiver device (e.g., a HDTV device) over white space. Exemplary implementations of a white space device are described further herein. However, various implementations of such a white space device are possible, and any implementation of a white space device that is operable to deliver information from a user device over white space is within the scope of the present disclosure.

In order for white space devices to operate in white space, some sensing is performed (e.g., to identify/confirm the unused "white space" available in the TV band). Thus, a white space device quiets its transmitter for periodic intervals of time during which the sensing can be performed by the device. In one embodiment, "quieting" includes turning off the transmitter, while in other embodiments quieting includes filtering the transmission, switching the transmitting to a non interfering frequency or some other action that permits sensing to occur.

It becomes desirable to employ a method for quieting the transmitter in a manner that does not impact/degrade (or reduces/minimizes impact/degradation) on the quality of the transport stream being transmitted (e.g., to enable a high-quality audio/visual experience for a user). In other words, it is desirable to inconspicuously quiet the transmitter. This may be particularly desirable for applications involving real-time transmission/streaming of video, audio, and/or other content, such as in the case of a user desiring to have multimedia content of a video be delivered from a portable user device for output on a TV device (e.g., HDTV device) for an improved multimedia experience.

Embodiments of the present disclosure are directed to quieting a white space device's transmitter for sensing white space signals. The quieting is performed in a manner that reduces or minimizes degradation to the transmitted transport stream (e.g., moving pictures expert group (MPEG)-2 transport stream (TS), Real-time Transport Protocol (RTP) transport stream, and Transport Control Protocol (TCP) stream) output by the white space device. Again, it is often necessary to quiet the transmitter periodically to allow for sensing to be performed by the white space device, and it is desirable to quiet the transmitter in a way that reduces or minimizes degradation of the transmission of the content contained in the transport stream being transmitted by the white space device (e.g., with reduced or minimal disruption to the real-time streaming of the audio/visual information being transmitted for display).

As discussed further herein, various techniques may be employed for managing the streaming of content (e.g., multimedia content) so as to allow for certain time frames that are available for quieting the transmitter inconspicuously (i.e., with reduced or minimal disruption to the audio/visual information being displayed on a receiving HDTV device). This will be referred to generally herein as "inconspicuous" transmitter quieting.

As discussed further below, embodiments of the present disclosure provide various implementations that modify the transport stream for inconspicuous transmitter quieting within the white space device. Related U.S. patent application Ser. No. 12/984,038, the disclosure of which is expressly incorporated herein by reference in its entirety, describes exemplary application layer techniques for inconspicuous transmitter quieting within the white space device. Embodiments described herein provide exemplary techniques for modifying a transport stream for inconspicuous transmitter quieting within a white space device, as described further below.

Figure 1:
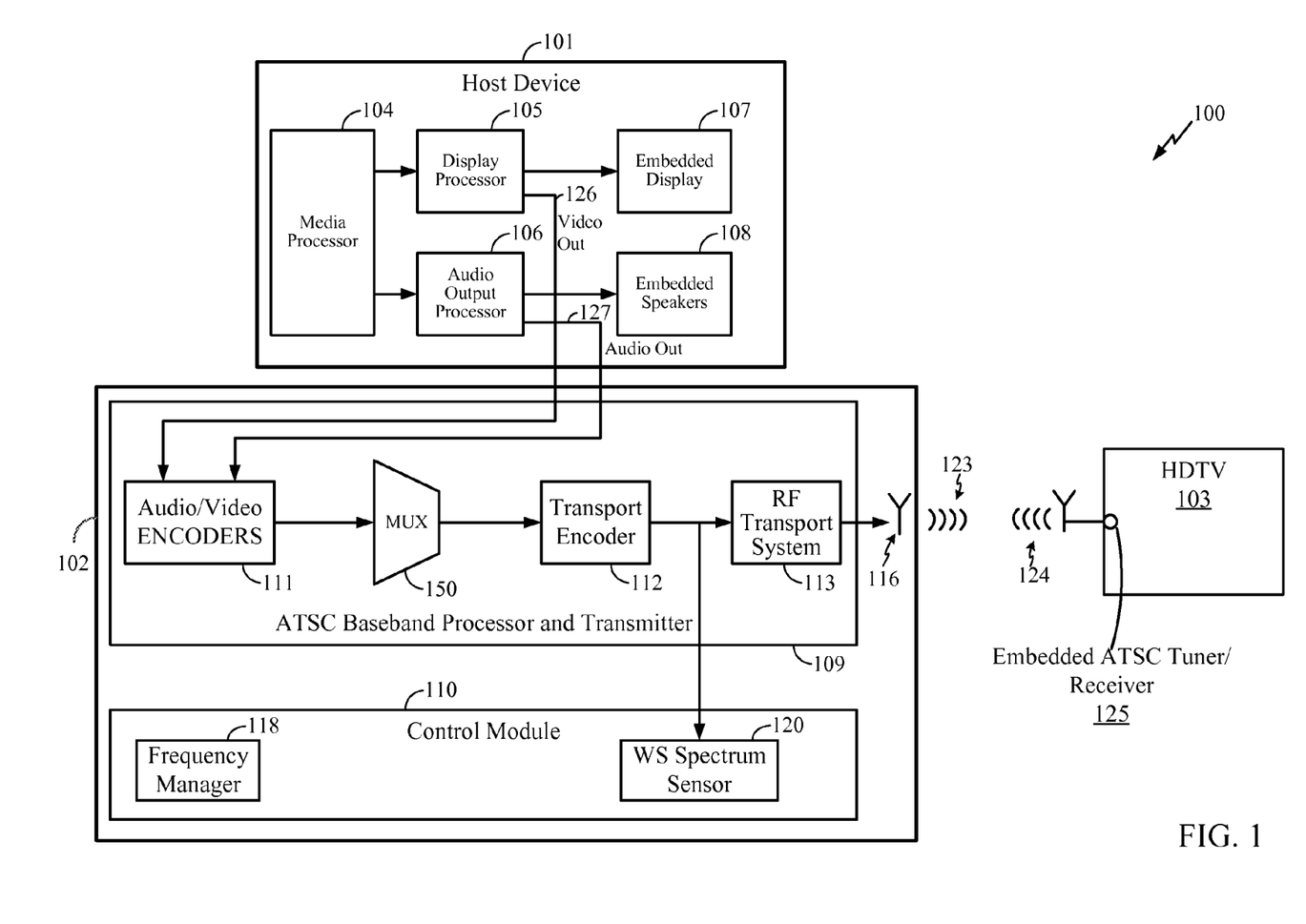
FIG. 1 is an illustration of an exemplary system within which embodiments of the present disclosure may be implemented.

FIG. 1 is an illustration of an exemplary system 100 within which embodiments of the present disclosure may be implemented. The system 100 includes an exemplary user device 101, which may be referred to as a "host" device. An exemplary implementation of the user device 101 is shown in a block-diagram form in FIG. 1. In the illustrated example, the user device 101 is shown as a mobile device, but in other embodiments the user device 101 need not be a mobile device. The exemplary user device 101 generally includes one or more processors, such as a media processor 104, display processor 105, and/or audio output processor 106, and the user device 101 may have embedded input/output devices, such as an embedded display 107 and embedded speakers 108. Of course, the user device 101 may be configured differently in a given implementation (e.g., include different and/or additional functional blocks than those shown in FIG. 1), and any such implementation is within the scope of the present disclosure.

The user device 101 is generally operable to generate content, which may be output via its embedded output devices (e.g., embedded display 107 and speakers 108). Various types of content are well known in the art for being output on user devices, and any such content may be output on the user device 101 in a given application. For instance, a multimedia player application may be executing on the user device 101 to output multimedia content (e.g., a movie, etc.). Of course, other content, such as textual content and/or other graphical/image and/or audio content (e.g., email content, web browsing content, video gaming content, word processing content, etc.) may be output in a given application with which a user may be interacting via the user device 101.

The user may be inputting information to the user device 101 (e.g., for interacting with an application executing thereon) via one or more human interface input device(s) (not shown in FIG. 1), such as a pointer device (e.g., mouse), joystick, keyboard, touch-screen interface, microphone, etc. In some instances, such user input information may result in some output being generated or modified. For instance, input of a user's mouse movement may result in corresponding movement of a pointer on an embedded display 107 of the user device 101.

Also included in the exemplary system 100 is a white space device 102, an exemplary implementation of which is shown in a block-diagram form in FIG. 1. The white space device 102 is communicatively coupled with the user device 101 for receiving information from such user device 101. In one embodiment, the white space device 102 is a separate device, which may be referred to as a "dongle," that is communicatively coupled with the user device 101. The white space device 102 may be coupled via a USB connection, PCIe interface, or in any suitable manner that allows for information from the user device 101 to be captured by the white space device 102 as discussed further herein. For example, the white space device 102 may be communicatively coupled with the user device 101 via any suitable type of wired connection or via a wireless communication connection, such as wireless USB (WUSB), Bluetooth, 802.11, etc.

The white space device 102 captures information from the user device 101. For instance, the captured information includes content that is to be output via an output device, such as "video out" 126 and/or "audio out" 127, as shown in FIG. 1. As discussed further herein, other information may also be captured by the white space device 102 in certain embodiments, such as "human interface device" (HID) data, e.g., user-input commands (e.g., mouse movements, joystick movements, keyboard input, and/or other commands received via human interface device(s)). The white space device 102 is operable to wirelessly transmit by a transmitter 116 over wireless communication 123, via white space, information captured from the user device 101 to, for instance, allow the content (e.g., multimedia content) captured from the user device 101 to be received and output by a device, such as a monitor with an ATSC tuner, e.g., the high definition television (HDTV) 103 shown in FIG. 1.

In the illustrated example of FIG. 1, the white space device 102 transmits Advanced Television Systems Committee (ATSC) signals over the air on a white space channel, thereby effectively acting as a television station transmitter. Thus, as shown in block diagram form, the exemplary white space device 102 of FIG. 1 includes an ATSC baseband processor and transmitter 109. As is known in the art, ATSC is compatible with the well-known MPEG-2 Transport Stream (TS), and thus the exemplary white space device 102 includes audio/video decoders 111, e.g., MPEG-2/AC-3, for encoding the captured information from the user device 101. The encoded data is transmitted via a multiplexer 150 to a transport encoder 112, e.g., an MPEG-2 TS encoder. Subsequently, transport stream packets are sent to an RF transmission system 113 (and a transmitter (e.g., antenna) 116) for wireless transmission via white space 123.

The HDTV 103 includes an embedded wireless receiver 124 and ATSC tuner/receiver (e.g., a conventional television tuner) 125 such that it can receive and process the ATSC signals (e.g., the MPEG-2 TS) for output to the display and/or speakers of the HDTV device 103.

The exemplary white space device 102 of FIG. 1 further includes a control module 110 that has a white space spectrum sensor 120 for sensing the white space (e.g., for sensing signals within the TV whitespace). Such sensor 120 periodically performs sensing to determine the available white space. Frequency manager logic 118 can adjust the channel when needed to maintain the white space device's transmission within the determined available white space. As discussed further herein, embodiments are provided for inconspicuously quieting the transmitter 116 to enable the sensor 120 to perform its sensing during such quieting to improve the quality of sensing being performed Of course, ATSC is only one example of a set of television transmission standards that can be employed by the white space device 102, and in other embodiments any of a variety of television standards, such as ATSC standards, Digital Video Broadcasting (DVB) standards, Integrated Services Digital Broadcasting (ISDB) standards, Digital Multimedia Broadcast (DMB) standards, and the like can be employed to transmit media content over white space.

As mentioned above, the exemplary white space device 102 of FIG. 1 converts the information captured from user device 101 to a MPEG-2 transport stream for transmission, which is compatible with ATSC and thus can be received and processed by the ATSC receiver/tuner 125 of HDTV 103.

As discussed further herein, various techniques may be employed for managing the streaming of audio/visual information so as to allow for certain time frames that are available for quieting the transmitter 116 (of FIG. 1) inconspicuously (i.e., with reduced or minimal disruption to the audio/visual information being displayed on a receiving HDTV device 103). As discussed further below, various implementations are provided that modify the transport stream for inconspicuous transmitter quieting within the white space device.

Exemplary Transport Stream Modification Implementations.

Various techniques may be employed for inconspicuously quieting a white space device's transmitter 116 through modification of the transport stream. Suppose, for instance, that a transport stream rate of 30 frames per second (fps) is being utilized, which implies each frame is about 33 ms. Further suppose that a 10 ms window is desired within each second for sensing white space (e.g., by the sensor 120). The white space device's transmitter 116 is to be quieted for the 10 ms sensing window. It thus becomes desirable to manage the streaming of audio/visual information from the white space device's transmitter 116 so as to allow for such 10 ms windows to be available for quieting the transmitter 116 inconspicuously (i.e., with reduced or minimal disruption to the audio/visual information being transmitted via wireless communication for display on a receiving HDTV device 103). In some embodiments, the sensing occurs without actually quieting the transmitter.

ATSC defines one band of TV signals that may be used by a white space device 102 in certain embodiments. For transport, ATSC uses the MPEG-2 systems specification, known as an MPEG-2 transport stream (TS), to encapsulate data, as discussed above.

Exemplary implementations for modifying such MPEG-2 transport stream in order to enable inconspicuous transmitter quieting, in accordance with embodiments of the present disclosure, are discussed below.

Exemplary Implementation 1 (Adjust Program Clock Reference (PCR) to Permit Aggregation of NULL Packets):

A sensing window (e.g., of 10 ms) can be achieved by sending NULL packets in the transport stream. The multiplexer 150 inserts null packets to make up for the required bandwidth. The position of these NULL packets could be modified in such a way that for a continuous period of, say 10 ms, no actual data is sent.

Figure 2A:
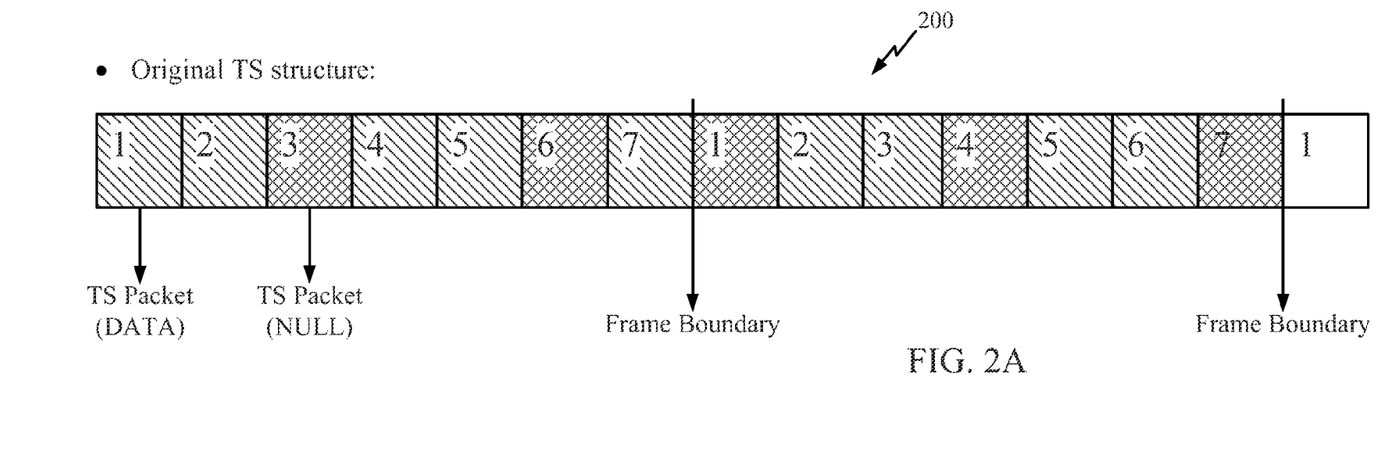
FIG. 2A shows an example of an original transport stream (TS) structure that may be formed for transmitting multimedia content.
Figure 2B:
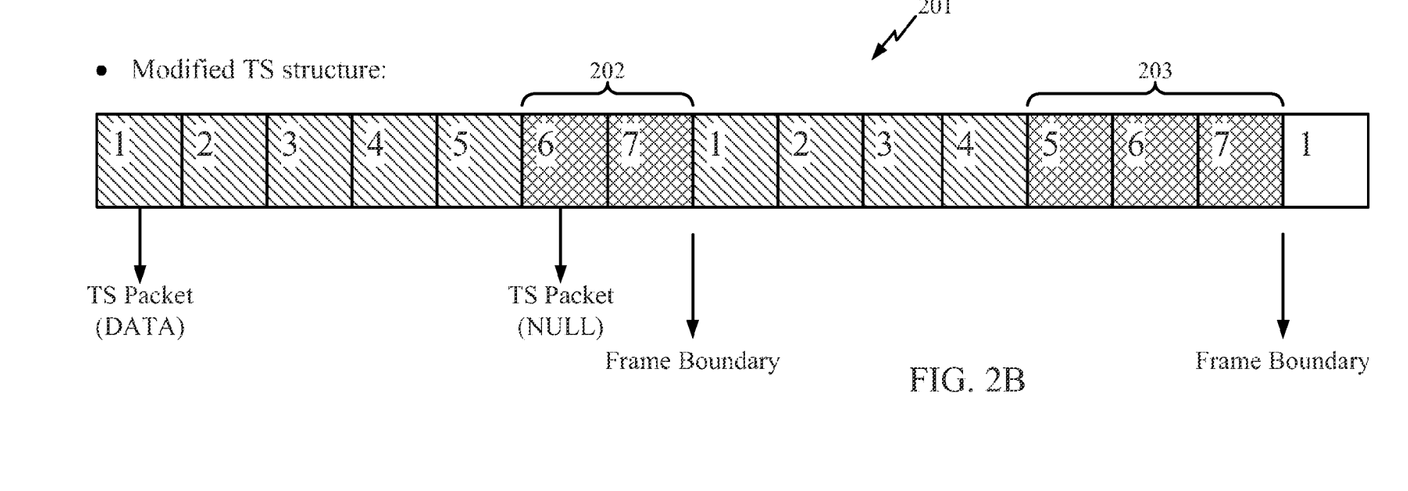
FIG. 2B shows an example of a modified TS structure that may be formed in accordance with an embodiment of the present disclosure.

FIG. 2A shows an example of an original transport stream (TS) structure 200 that may be formed for transmitting multimedia content, and FIG. 2B shows an example of a modified TS structure 201 that may be formed in accordance with an embodiment of the present disclosure. As illustrated in the modified TS structure 201 shown in FIG. 2B, the multiplexer 150 aggregates and moves the NULL packets to pre-determined position(s) within the transport stream, such as the exemplary aggregated NULL packets 202 and 203 shown in the exemplary modified TS structure 201. The control module 110 coordinates the aggregation by the multiplexer 150 and also synchronizes sensing by the white space device 102 (e.g., by sensor 120) with the occurrence of the pre-determined position(s) of the aggregated NULL packets in the transport stream.

However, in this technique care should be taken to modify the program clock reference (PCR) in each of the video and audio frames to avoid buffering problems (e.g., buffer underflows). That is, the PCR stamps should be adjusted properly (or the frame buffers should be increased) so that even when a data packet arrives earlier than its presentation time stamp (PTS), it is stored in the buffer and displayed at the appropriate time.

Figure 3:
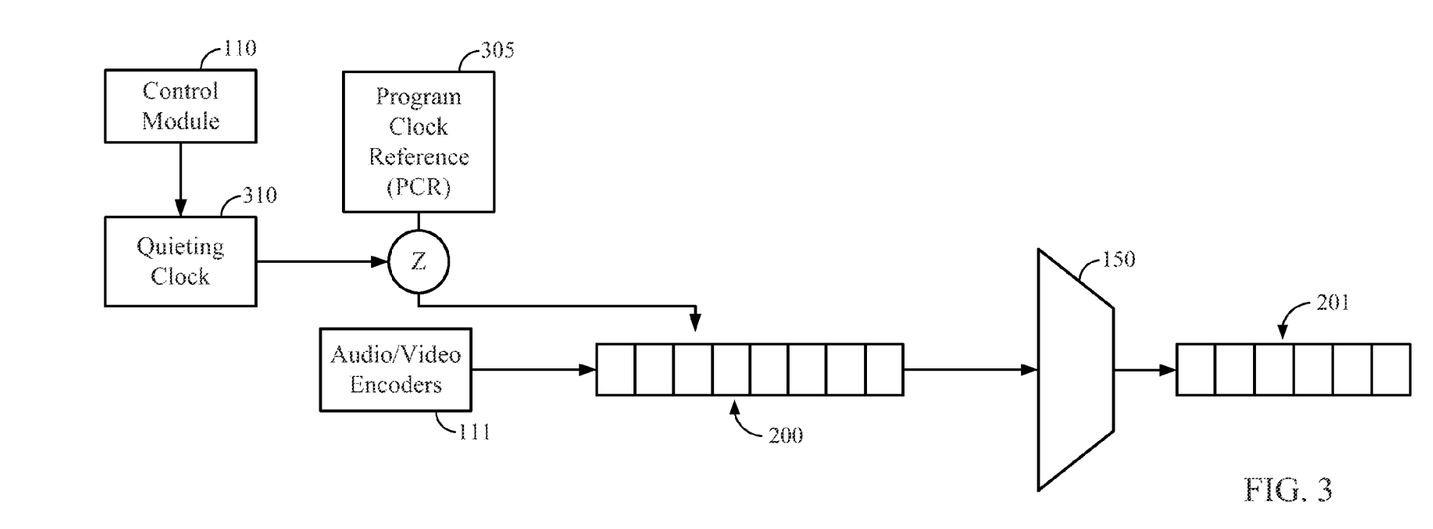
FIG. 3 is an illustration of an exemplary system for delaying a program clock reference (PCR) according to one aspect of the present disclosure

An exemplary embodiment for modifying the PCR stamps will be described with respect to FIG. 3. The control module 110 controls a quieting clock 310 (which is based on the system clock (not shown)) to insert a delay component, Z. Thus, information from the program clock reference (PCR) 305 is delayed for the duration of the null packet before being inserted into the original transport stream structure 200. The modified PCR stamps are also included in the modified transport structure 201, which is created by the multiplexer 150. Consequently, the decoder 125 will be able to correctly process the received transport stream based on the modified PCR stamps.

Exemplary Implementation 2 (Identify Individual Video and Audio Frames and Modify Only a Few Null Packets):

Another option identifies the individual video and audio frames within the transport stream (TS) and modifies only a few null packets within each frame so that the PCR and PTS do not significantly vary. In this method, the start of a video or audio frame may be identified using the Payload Unit Start Indicator and only a few pre-determined number (e.g., 2) of null packets are removed from each frame. For a sensing period of 10 ms, assuming the TS frame rate is 30 (fps), then the control module 110 instructs the multiplexer 150 to remove 130 null packets from the TS and re-insert 130 null packets at the end of each second. The control module 110 also synchronizes the sensing by the white space device 102 (e.g., by sensor 120) with the occurrence of the 130 null packets at the end of each second.

Figure 4:
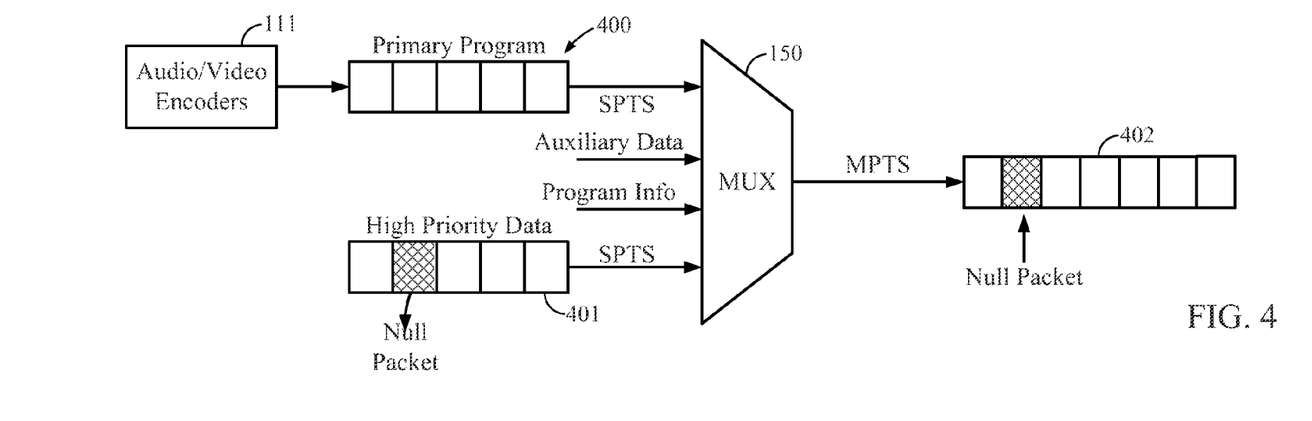
FIG. 4 is an illustration of an exemplary multiplexing according to one aspect of the present disclosure.

Exemplary Implementation 3 (Insert Additional "Dummy" Program into the Stream):

Another option for ensuring a pre-determined number of null packets at the appropriate time is to include an additional program (with a corresponding program ID or "PID") with NULL packets. As seen in FIG. 4, an additional program 401 is multiplexed with the primary program 400, as well as with ancillary data and program information. In one embodiment, the additional program 401 has a variable bit rate. In another embodiment the additional program has a fixed bit rate.

The multiplexer 150 receives this high priority data stream 401, which the control module 110 engineered, in such a way that this particular NULL packet is always at a pre-determined position (e.g., at the end of each second). That is, a high-priority "dummy" program 401 (in this example a single program transport stream (SPTS)) having null packets is inserted in order to effectively vary a multiple program transport stream (MPTS) 402. By prioritizing the NULL packet, the actual data once multiplexed, will not occur at the predetermined position because the higher priority NULL packet occurs at that time. A potential advantage of this implementation is that the PCR and PTS of the actual video and audio data packets are not impacted. In certain embodiments, the video bit rate of such inserted program can change/vary.

Figure 5:
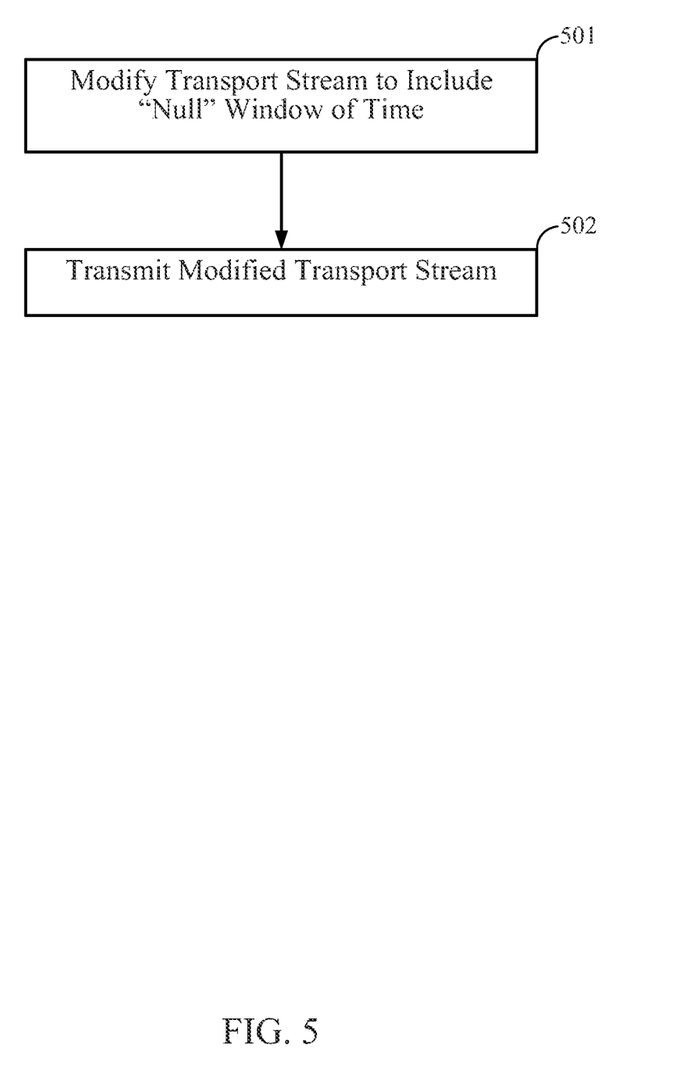
FIG. 5 shows an exemplary operational flow in accordance with one aspect of the present disclosure.

FIG. 5 shows an exemplary operational flow for inconspicuous quieting of a transmitter (e.g., the transmitter 116 of FIG. 1) in a white space communication device (e.g., the white space device 102 of FIG. 2) according to one embodiment of the present disclosure. The inconspicuous quieting ensures reduced or minimal disruption to service provided by the white space device 102.

In block 501, the transport stream is modified for transmission by the transmitter of the white space communication device to provide a "null" window of time within the transport stream. Such null window does not contain essential information (i.e., it does not contain payload multimedia information that is needed for presentation to a user at a receiving device). The transport stream may be modified by a processing element of the white space communication device. For instance, as discussed above, the transport stream may be modified by the control module 110 of the white space device 102 shown in FIG. 1, as an example. The null window may, for example, be positioned at a predetermined location (or locations) within the transport stream, and the performance of white space sensing (e.g., by sensor 120 of FIG. 1) may be synchronized with the occurrence of the null window.

As discussed above, any of various different techniques may be employed for modifying the transport stream in block 501. As one example, the null window may be formed by aggregating multiple null packets present in a defined time interval of the transport stream (e.g., a one second time interval), and positioning the aggregating null packets in a predetermined position (or positions) within the defined time interval of the transport stream. Such aggregating of the null packets and positioning of the aggregated null packets at the predetermined position may be performed, for example, by the control module 110 of the white space device 102 shown in FIG. 1. As mentioned above, in this optional embodiment, the program clock reference is also modified in at least some multimedia frames present in the defined time interval of the transport stream.

As another example, modifying the transport stream may include identifying individual multimedia frames present in a defined time interval of the transport stream, and removing a predetermined number of null packets from each transport stream. The removed null packets may be aggregated, and the aggregated null packets positioned in a predetermined position (or positions) within the defined time interval of the transport stream, thereby forming the null window. Such identification of the individual multimedia frames, removal of the predetermined number of null packets from each transport stream, aggregation of the removed null packets, and positioning of aggregated null packets within the transport stream may be performed, for example, by the control module 110 of the white space device 102 shown in FIG. 1.

As another example, an additional program having null packets may be inserted into a predetermined position (or positions) within the transport stream, thereby forming the null window as corresponding to the predetermined position at which the additional program is inserted. Such insertion of the additional program may be performed, for example, by the control module 110 of the white space device 102 shown in FIG. 1.

In block 502, at least a portion of the modified transport stream is transmitted by the transmitter of the white space communication device. In one embodiment, the control module 110 quiets the transmitter during the null window. In other words, the transmitter operates to ensure licensed ATSC signals and wireless microphone signals can be sensed during the null window without interference from the transmitter.

In one configuration, a white space device (e.g., the white space device 102 of FIG. 1) has a transmitter (e.g., transmitter 116 of FIG. 1) configured to transmit multimedia information in a transport stream via white space. The white space device further has a white space sensor (e.g., sensor 120 of FIG. 1) configured to sense white space signals present in a television band. The white space device further has a transport stream encoder 112 configured to process a stream of multimedia information to form a transport stream, for transmission by the transmitter, that includes a "null" window of time within the transport stream. The null window does not contain the multimedia information desired to be transmitted.

In one configuration, a white space device (e.g., the white space device 102 of FIG. 1) includes a means for transmitting multimedia information in a transport stream via white space. For instance, such means for transmitting may be a transmitter 116 (as shown in FIG. 1). The device further includes a means for sensing signals in the white space. For instance, such means for sensing may be a white space sensor 120 (as shown in FIG. 1). The device further includes means for modifying a transport stream for transmission by the transmitter to provide a "null" window of time within the transport stream. The null window does not contain essential information desired to be transmitted. For instance, the means for modifying the transport stream may be the control module 110.

In one exemplary implementation, the means for modifying the transport stream includes means for aggregating null packets present in a defined time interval of the transport stream, and means for positioning the aggregated null packets at the predetermined time within the defined time interval of the transport stream, thereby forming the null window. For instance, the means for modifying the transport stream may be the control module 110.

In another exemplary implementation, the means for modifying the transport stream includes means for modifying a program clock reference in at least some multimedia frames present in the defined time interval of the transport stream. For instance, the means for modifying the transport stream may be the control module 110.

In still another exemplary implementation, the means for modifying the transport stream includes means for identifying individual multimedia frames present in a defined time interval of the transport stream; means for removing a predetermined number of null packets from each frame; means for aggregating the removed null packets; and means for positioning the aggregated null packets at the predetermined time within the defined time interval of the transport stream, thereby forming the null window. For instance, the means for modifying the transport stream may be the control module 110.

In yet another exemplary implementation, the means for modifying the transport stream includes means for multiplexing an additional program having null packets at the predetermined time into the transport stream, thereby forming the null window at the predetermined time. For instance, the means for modifying the transport stream may be the multiplexer 150.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for inconspicuous quieting of a transmitter in a white space device, the method comprising:
    modifying, with transport layer information, a transport stream for transmission by the transmitter of the white space device to include a null window of time at a predetermined position within the transport stream;
    performing white space detection of licensed Advanced Television Systems Committee (ATSC) signals at a timing synchronized with an occurrence of the predetermined position of the null window, wherein the null window does not interfere with the white space detection; and
    transmitting the modified transport stream by the transmitter of the white space device.

2. The method of claim 1 further comprising:
    quieting the transmitter during the null window.

3. The method of claim 1, in which the null window comprises non-essential information.

4. The method of claim 1 in which modifying the transport stream further comprises:
    aggregating a plurality of null packets present in a defined time interval of the transport stream; and
    positioning the aggregated plurality of null packets at the predetermined time within the defined time interval of the transport stream, thereby forming the null window.

5. The method of claim 4 in which the defined time interval is a one-second interval.

6. The method of claim 4 in which modifying the transport stream further comprises:
    modifying a program clock reference associated with at least one multimedia frame present in the defined time interval of the transport stream.

7. The method of claim 1 in which modifying the transport stream further comprises:
    identifying individual multimedia frames present in a defined time interval of the transport stream;
    removing a predetermined number of null packets from each frame;
    aggregating the removed null packets; and
    positioning the aggregated null packets at the predetermined time within the defined time interval of the transport stream, thereby forming the null window.

8. The method of claim 1 in which modifying the transport stream further comprises:
    multiplexing an additional higher priority program having null packets at the predetermined time with the transport stream, thereby forming the null window at the predetermined time.

9. The method of claim 1 in which the transport stream comprises a moving pictures experts group (MPEG)-2 transport stream, a Real-time Transport Protocol (RTP) transport stream, and a Transport Control Protocol (TCP) stream.

10. A white space device comprising:
    a transmitter configured to transmit multimedia information in a transport stream via white space;
    a white space sensor configured to sense licensed Advanced Television Systems Committee (ATSC) signals present in the white space at a timing synchronized with an occurrence of a null window, wherein the null window does not interfere with the sensing of ATSC signals; and
    a transport layer stream processor configured to process the transport stream, to include the null window of time at a predetermined time and a predetermined position within the transport stream, the null window not containing multimedia information.

11. The device of claim 10 in which the transmitter is quieted during the null window.

12. The device of claim 10 in which the transport layer stream processor is further configured:
    to aggregate a plurality of null packets present in a defined time interval of the transport stream; and
    to position the aggregated plurality of null packets at the predetermined time within the defined time interval of the transport stream, forming the null window.

13. The device of claim 12 in which the transport layer stream processor is further configured:
    to modify a program clock reference associated with at least one multimedia frame present in the defined time interval of the transport stream.

14. The device of claim 10 in which the transport layer stream processor is further configured:
    to identify individual multimedia frames present in a defined time interval of the transport stream;
    to remove a predetermined number of null packets from each frame;
    to aggregate the removed null packets; and
    to position the aggregated null packets at the predetermined time within a defined time interval of the transport stream, forming the null window.

15. The device of claim 10 in which the transport layer stream processor is further configured:
    to multiplex an additional program having null packets at the predetermined time into the transport stream, forming the null window at the predetermined time.

16. A white space device comprising:
    means for transmitting multimedia information in a transport stream via white space;
    means for sensing white space licensed Advanced Television Systems Committee (ATSC) signals at a timing synchronized with an occurrence of a null window, wherein the null window does not interfere with the sensing of ATSC signals; and
    means for modifying, with transport layer information, the transport stream to include the null window of time at a predetermined time and a predetermined position within the transport stream, the null window not containing multimedia information.

17. The device of claim 16 in which the means for modifying comprises:
    means for aggregating a plurality of null packets present in a defined time interval of the transport stream; and
    means for positioning the aggregated plurality of null packets at the predetermined time within the defined time interval of the transport stream, to form the null window.

18. The device of claim 16 in which the means for modifying comprises:

means for modifying a program clock reference associated with at least one multimedia frame present in a defined time interval of the transport stream.

19. The device of claim 16 wherein the means for modifying comprises:

means for identifying individual multimedia frames present in a defined time interval of the transport stream;

means for removing a predetermined number of null packets from each frame;

means for aggregating the removed null packets; and means for positioning the aggregated null packets at the predetermined time within the defined time interval of the transport stream, to form the null window.

20. The device of claim 16 wherein the means for modifying comprises:

means for multiplexing an additional program having null packets at the predetermined time into the transport stream, to form the null window at the predetermined time.

21. A non-transitory computer readable medium having program code recorded thereon for inconspicuous quieting of a transmitter of a white space device, the program code comprising:

program code to modify, with transport layer information, a transport stream for transmission by the transmitter of the white space device to include a null window of time at a predetermined position within the transport stream, the null window not containing multimedia information, program code to sense white space licensed Advanced Television Systems Committee (ATSC) signals at a timing synchronized with an occurrence of the null window, wherein the null window does not interfere with the white space sensing; and program code to transmit the modified transport stream.

* * * * *